March 8, 1927.  H. FAUROT  1,619,923

WINDOW CHANNEL STRIP

Filed Aug. 26, 1925

Witness:

Inventor:
Henry Faurot,
By

Patented Mar. 8, 1927.

1,619,923

UNITED STATES PATENT OFFICE.

HENRY FAUROT, OF CHICAGO, ILLINOIS, ASSIGNOR TO WESTERN FELT WORKS, OF CHICAGO, ILLINOIS, A CORPORATION OF WEST VIRGINIA.

WINDOW CHANNEL STRIP.

Application filed August 26, 1925. Serial No. 52,507.

This invention relates to channel strips for windows of automobiles or the like and more particularly to a channel strip adapted to serve both as a cushion and guide for the raw edge of a pane of glass.

The invention will be described in connection with the ordinary window channel in a closed automobile wherein the glass panes are adapted to be slid vertically up and down by any mechanism desired, but is not limited to this application as will be appreciated. It is desirable that channel strips for such purposes as those mentioned, not only guide the edge of the pane of glass during its rising and lowering movements, but, that the strip form a cushion for the edge of the pane and the side faces of the pane adjacent its edge, and also, that the faces of the pane of glass adjacent the guided edge be closely engaged by the channel strip to prevent rattling and the entrance of wind or rain and other elements.

Heretofore, so far as I am aware, no one has succeeded in devising a cushioned channel strip which, when formed into channel shape, would permanently retain its shape. I have found, however, that I can utilize soft, uncompressed fiber to attain the cushioning effect and by suitably stiffening the fiber, obtain a filler which may be pressed into permanent shape. A suitable felt cover or cover slip is arranged about the filler in a unique manner. There are numerous channel strips now on the market, but none of them afford the desirable objects above mentioned, few are simple in construction and most are expensive to manufacture or apply.

With my invention I entirely overcome these defects and provide a channel strip economical to manufacture, simple in structure and unusually serviceable for its object and not only readily adaptable to window channels, but which may be purchased and installed without material expense.

With the foregoing and other objects which will become apparent from the description and claims, the invention is illustrated in a preferred form in the accompanying drawing in which:

Figure 1:
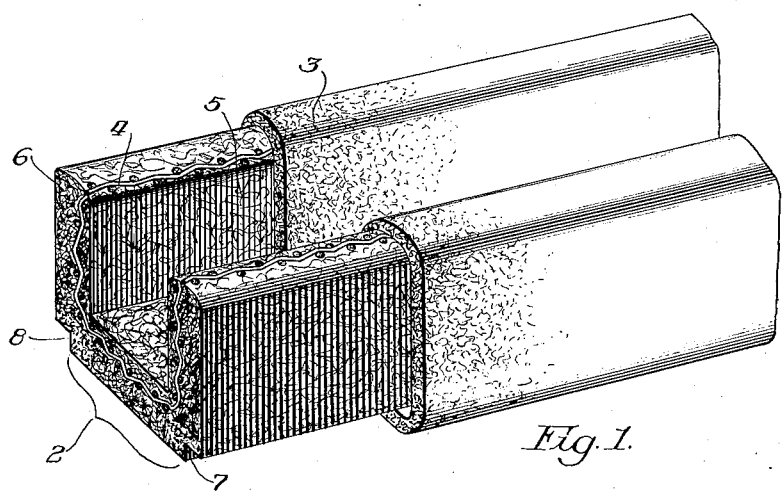
Fig. 1 is an enlarged perspective view with certain portions of the cover broken away to show the interior construction.
Figure 2:
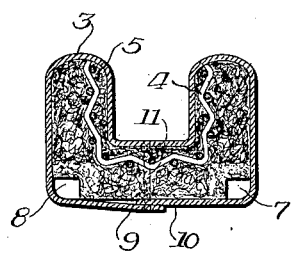
Fig. 2 is a transverse sectional view on a reduced scale.
Figure 3:
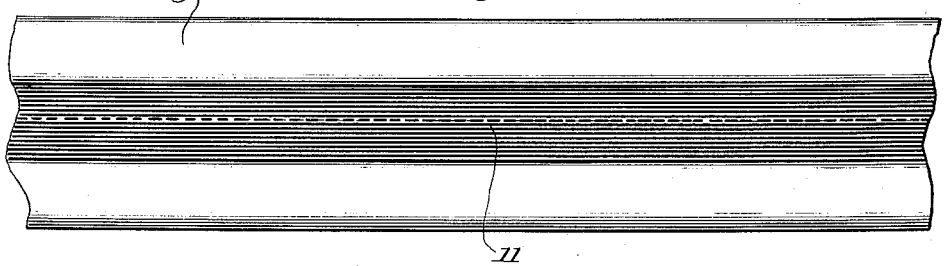
Fig. 3 is a top plan view of the same.

Briefly the channel strip is composed of a filler portion 2 and a cover portion generally designated 3. The filler 2 is preferably composed of a facing 4 of any material such as large meshed or loosely woven burlap and a backing 6 of fibre in an uncompressed but interlocked state. The fibre is preferably attached to the facing 4 through the medium of individual strands of fibre worked through the mesh of the facing and in this manner is prevented from bunching or creeping with respect to the facing or channel due to shocks or jars and the sliding movements of the window pane. The fibre, as will be apparent, will readily interlock through and slightly mat on the interior face of the fabric facing as is clearly indicated at 5. In order to form the channel strip in U or channel shape, the backing of fibre is cut longitudinally to a portion of its depth along the lines where it may be desired to bend it. After bending, the cuts open up as shown at 7 and 8. The cuts shown open at 7 and 8 are to be distinguished from pre-formed grooves or channels cut in the fiber or other material, for by cutting as I do much time and labor are saved with increased efficiency and a lower cost of article. One of the old ways of forming channel strips and the like is to cut grooves or channels in the top surface along the lines where they are to be bent, but as is well known this is costly.

However, prior to bending or rolling or otherwise forming the channel strip into the shape desired, it is covered with the covering 3 of sheet felt material. The ends 9 and 10 may be overlapped slightly, one over the other, and a single row of stitching indicated at 11 is passed therethrough centrally between the sides of the strip and longitudinally thereof to secure the assembly together. Thereafter, the strip may be formed into U or channel shape by any of the well-known methods, but I prefer to pass the strip between heated forming rolls whereby the channel strip may be made to practically permanently retain its U or channel shape. The cuts in the back of the filler, of course, contribute to this end.

Many changes may be made in the construction without departing from the spirit of the invention or the scope of the appended claims and for such reason, I do not wish to be limited to the details or form of construction illustrated and described.

I claim:

1. A channel strip comprising, a fibre filler having a loosely woven fabric covering the face thereof to be presented toward the glass, said fibre being intermeshed with said fabric, and a felt cover for said filler and fabric surrounding said filler and fabric.

2. A channel strip comprising, a fibre filler having longitudinal cuts along the back thereof at suitable points whereby the marginal edges may be bent upwardly into parallel relation, a fabric facing intermeshed with the top face of said filler, and a felt cover secured about said filler and facing.

In witness of the aforegoing I affix my signature.

HENRY FAUROT.